United States Patent [19]
Winkler et al.

[11] 3,882,519
[45] May 6, 1975

[54] PHOTOGRAPHIC APPARATUS FOR USE WITH PERCUSSIVELY IGNITABLE AND ELECTRONIC FLASH UNITS

[75] Inventors: Alfred Winkler, Munich; Dieter Engelsmann, Unterhaching, both of Germany

[73] Assignee: Agfa-Gevaert Aktiengesellschaft, Leverkusen, Germany

[22] Filed: Aug. 22, 1973

[21] Appl. No.: 390,561

[30] Foreign Application Priority Data
Sept. 7, 1972  Germany............................ 2243832

[52] U.S. Cl. .................. 354/141; 240/1.3; 354/145
[51] Int. Cl. ........................................... G03b 15/05
[58] Field of Search......... 95/11 L, 11.5 R; 240/1.3; 359/144, 148, 141, 139, 149, 145

[56] References Cited
UNITED STATES PATENTS

| | | | |
|---|---|---|---|
| 3,353,463 | 11/1967 | Horton et al. | 95/11 L |
| 3,364,829 | 1/1968 | Ackerman | 240/1.3 X |
| 3,374,720 | 3/1968 | Harvey | 95/11.5 R |
| 3,511,148 | 5/1970 | Simon | 240/1.3 |
| 3,537,368 | 11/1970 | Radtke | 95/11 L |
| 3,703,131 | 11/1972 | Brigham | 354/142 X |
| 3,731,605 | 5/1973 | Kitagawa | 95/11 R |

Primary Examiner—Samuel S. Matthews
Assistant Examiner—Kenneth C. Hutchinson
Attorney, Agent, or Firm—Michael S. Striker

[57] ABSTRACT

A still camera which is provided with an indexible socket for a holder of percussively ignitable flash lamps can be used with an electronic flash unit whose base can be separably attached to the socket when the flash lamp holder is removed. The impeller which serves to initiate the ignition of the flash lamps performs the additional function of closing a switch in the casing of the electronic flash unit to thus complete the circuit of the source of artificial light in response to actuation of the camera release. The casing of the electronic flash unit can be provided with a base which is indexible with the socket or with a fixedly mounted base; in the latter instance, the attachment of the casing to the housing of the camera results in disengagement of the socket from the film transporting mechanism which normally serves to index the socket during transport of photographic film by the length of a frame.

3 Claims, 3 Drawing Figures

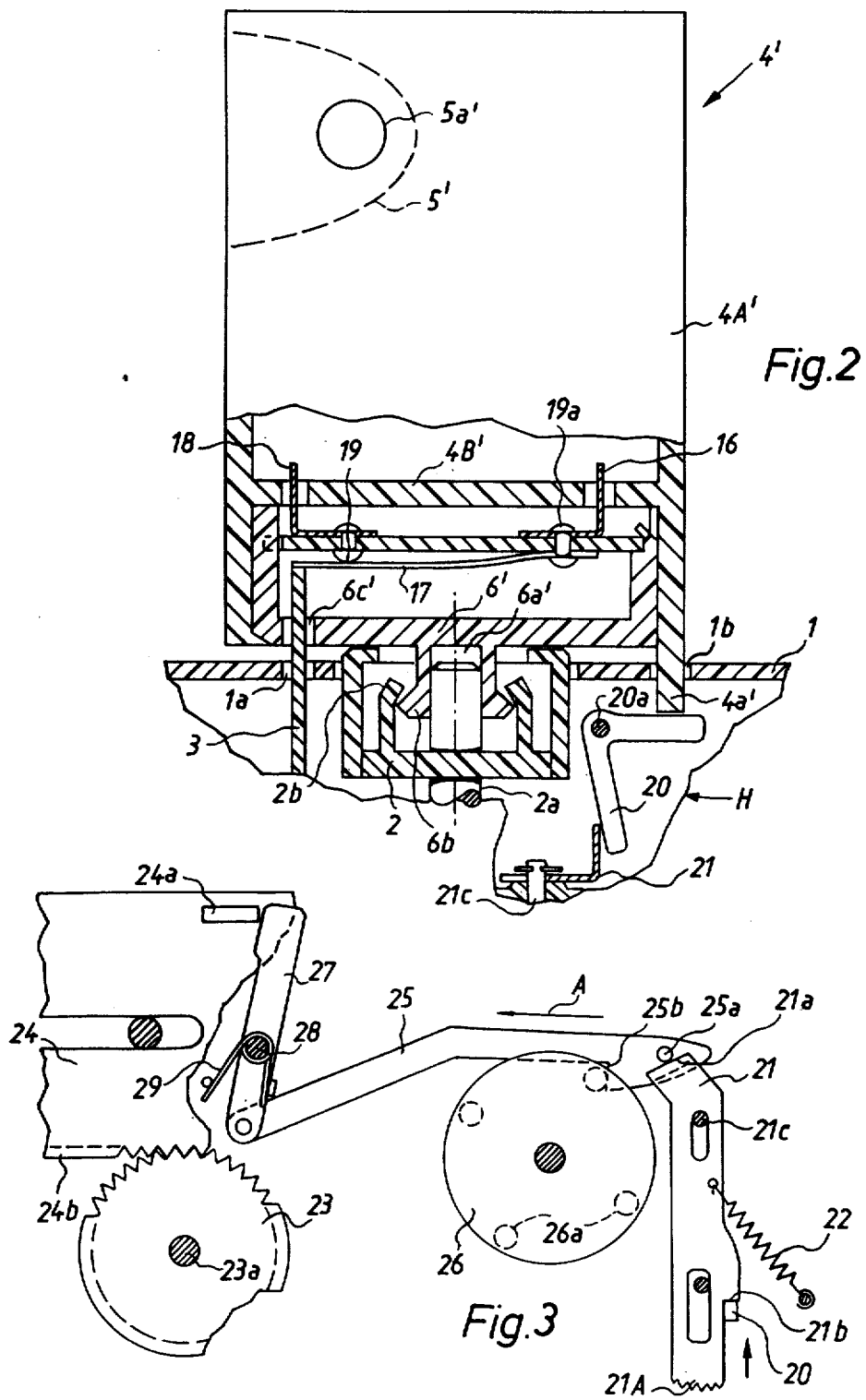

PHOTOGRAPHIC APPARATUS FOR USE WITH PERCUSSIVELY IGNITABLE AND ELECTRONIC FLASH UNITS

BACKGROUND OF THE INVENTION

The present invention relates to photographic apparatus and sources of artificial light in general, and more particularly to improvements in photographic apparatus which can be used with holders for percussively ignitable flash lamps.

It is known to provide a still camera with an indexible socket which can be connected with base of a holder for percussively ignitable flash lamps. Such holders are available on the market and are known as Magicubes (trademark). A camera which can take a holder for percussively ignitable flash lamps is provided with an impeller which is displaced in response to actuation of the camera release to thereby initiate the firing of a flash lamp while the shutter is open. Upon completion of an exposure, the user actuates the film transporting mechanism to thereby index the socket which moves a fresh flash lamp into an optimum position for illumination of the subject.

A drawback of the just described still cameras is that they cannot be used with electronic flash units unless their housing includes discrete means for supporting the casing of an electronic flash unit. Moreover, the aforementioned impeller and/or socket performs no useful function when a multiple flash lamp holder is detached from the socket.

SUMMARY OF THE INVENTION

An object of the invention is to provide a photographic apparatus, especially a still camera, which can be used with holders for percussively ignitable flash lamps and which can be used with equal advantage with electronic flash units.

Another object of the invention is to provide a photographic apparatus wherein the parts which perform useful functions when the apparatus is used with a holder for percussively ignitable flash lamps can also perform useful functions when the housing of the camera supports an electronic flash unit.

A further object of the invention is to provide a novel and improved electronic flash unit for use with the above outlined photographic apparatus.

An additional object of the invention is to provide an electronic flash unit which can be connected with the indexible socket of a photographic apparatus for use with holders for percussively ignitable flash lamps.

Still another object of the invention is to provide an electronic flash unit which, when connected to the socket of a still camera which can be used with percussively ignitable flash lamps, invariably produces artificial light at the exact moment when the shutter is open.

Another object of the invention is to provide an electronic flash unit which can be operated by a still camera for use with percussively ignitable flash lamps without necessitating substantial alterations in the design of the camera.

The invention is embodied in a novel and improved combination of a photographic apparatus, especially a still camera, with a novel and improved electronic flash unit. The photographic apparatus comprises a housing or body, an indexible socket which can support and rotate holders of percussively ignitable flash lamps and is mounted in or on the housing, and an impeller which is movable between first and second positions to thereby effect the firing of a flash lamp in a holder which is connected to the socket. The electronic flash unit comprises a casing having a portion which is separably connectable with the socket when the latter is not attached to a holder for flash lamps, and normally open switch means provided in the casing. The impeller is arranged to directly or indirectly open or close the switch means not later than when it reaches the second position. Such actuation of the switch means can initiate the completion of a circuit including the source of artificial light in the electronic flash unit.

The switch means may include a first contact which is connected to one pole of a source of electrical energy and at least one deformable or displaceable second contact which is connected to the other pole of the energy source and is located in the path of movement of the impeller when the casing is properly attached to the socket whereby the impeller deforms or displaces and thereby moves the second contact against the first contact.

The casing of the electronic flash unit may comprise an indexible base which is connectable to the socket socket or a fixedly mounted base which is also connectable to the socket; however, the flash unit then comprises means for deactivating the indexing mechanism for the socket or for disengaging the output element of such indexing mechanism from the socket.

The novel features which are considered as characteristic of the invention are set forth in particular in the appended claims. The improved combination itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is a fragmentary vertical sectional view of the still camera and a partly elevational and partly vertical sectional view of a modified electronic flash unit; and FIG. 3 is a fragmentary horizontal sectional view of the camera of FIG. 2, showing the manner in which the modified electronic flash unit can disengage the socket from the indexing mechanism.

DESCRIPTION OF THE PREFERRED EMBODIMENTS

Figure 1:
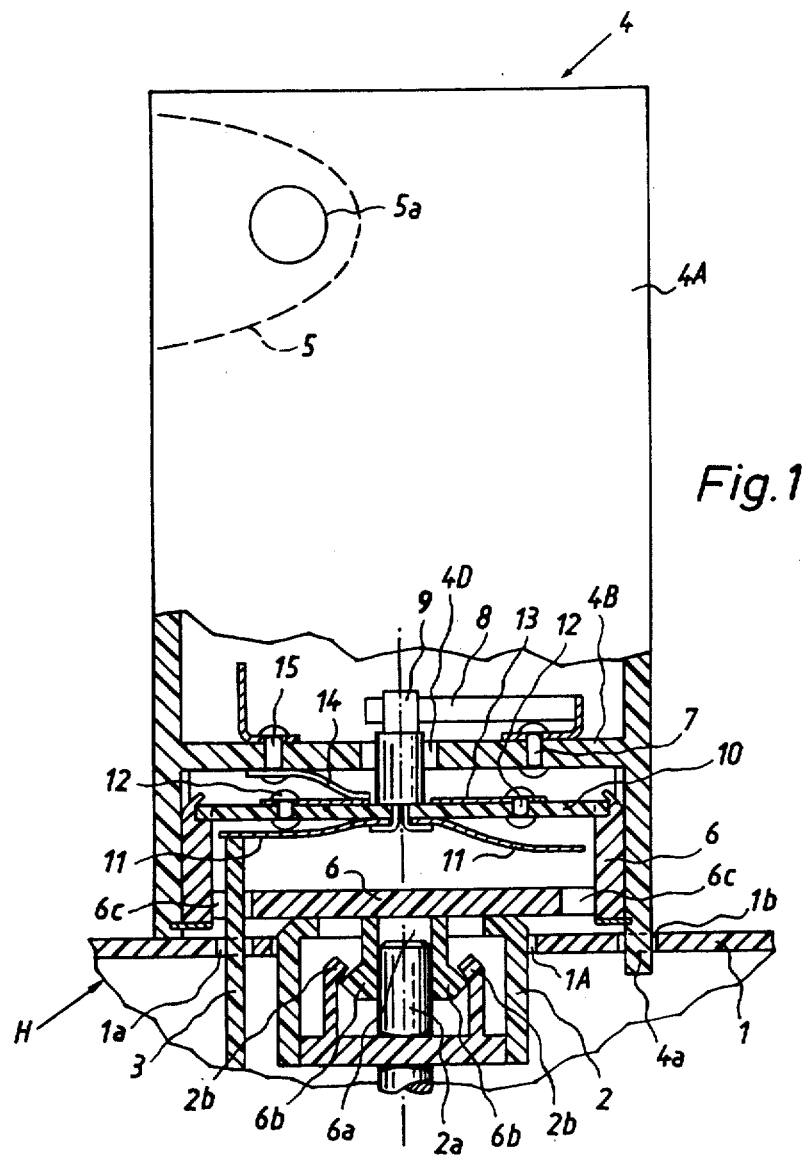
FIG. 1 is an enlarged fragmentary vertical sectional view of a still camera which embodies the invention and a partly elevational and partly vertical sectional view of an electronic flash unit which is constructed and assembled in accordance with a first embodiment of the invention.

Referring first to FIG. 1, there is shown a portion of a still camera having a housing or body H whose top wall 1 is provided with a circular aperature 1A for the upper portion of an indexible socket 2 for the bases of cubiform flash lamp holders of the type known as Magicubes (trademark). The manner in which the socket 2 is indexible about the axis of a post 2A will be described with reference to FIG. 3. A flash lamp holder of the type capable of having its base separably connected to the socket 2 comprises four flash lamps each of which is located in front of a reflector and each of which can be fired in response to an impact transmitted by an impeller 3 which is movable up, as viewed in FIG. 1, in response to actuation of the camera release, not shown.

The post 2a extends upwardly into the interior of the socket 2 and can enter a hollow foot forming part of the base of a multiple flash lamp holder. The socket 2 further comprises four equidistant resilient prongs or claws 2b which can engage complementary projections or recesses on the foot of a flash lamp holder to prevent unintentional angular and/or other displacement of the holder during the making of exposures.

The top wall 1 is further provided with a second aperture 1a for the impeller 3 and with a locating aperature 1b for a downwardly extending pin-shaped or otherwise configurated locating projection 4a forming part of the casing 4A of an electronic flash unit 4. When the casing 4A of the flash unit 4 is properly attached to the socket 2 and its projection 4a extends into the aperture 1b, the casing is held against angular movement relative to the top wall 1. In the embodiment which is shown in FIG. 1, the casing 4A of the flash unit 4 comprises a turnable platform or base 6 which is mounted in its lower portion and has a downwardly extending foot 6a which is provided with a central bore for the upper portion of the post 2a. The foot 6a further comprises four radially outwardly extending prongs 6b which can engage the claws 2b to thereby hold the casing 4A against unintentional separation from the socket 2. If desired, the prongs 6b can be replaced by a beaded collar which pushes the claws 2b while the post 2a penetrates into the foot 6a and which thereupon permits the claws 2b to move toward the post 2a and to separably engage and hold the foot 6a in attached position. The foot 6a is a functional equivalent of a foot forming part of the base of a multiple flash lamp holder. It will be noted that the platform or base 6 is indexible with the socket 2 while the remaining portion of the casing 4A is held against rotation due to the fact that the projection 4a extends into the aperture 1b of the top wall 1.

The base 6 is provided with four equidistant openings 6c one of which registers with the impeller 3 whenever the socket 2 is indexed to a new angular position. In this way, the impeller 3 can move upwardly to penetrate into the casing 4A above the base 6 when the user makes an exposure by actuating the camera release which triggers an upward movement of the impeller 3.

The casing 4A can contain an energy source (e.g., one or more batteries) or is connectable to an outlet by means of a plug and cord, not shown. The two poles of the energy source are connected with terminals 7 and 15 which are mounted in a horizontal partition 4B of the casing 4A at a level above the base 6. The partition 4B has a central opening 4D which receives with clearance a current-conducting sleeve 9 secured to and rotatable with an annular cover member 10 which is indexible with the base 6. The base 6, the cover member 10 and the partition 4B consist of an insulating material. The sleeve 9 is engaged by an elastic tongue 8 which is connected with the terminal 7. The lower end portion of the sleeve 9 is connected with four equidistant elastic contacts 11 one of which registers with the impeller 3 whenever the base 6 is at a standstill, i.e., in each of the four predetermined angular positions of the socket 2. When the impeller 3 moves upwardly, it flexes the adjacent contact 11 in a manner as shown in the left-hand portion of FIG. 1 whereby the thus deformed contact 11 engages a current-conducting rivet-shaped contact 12 mounted in the cover member 10. The cover member 10 carries four equidistant contacts 12 each of which is aligned with a different contact 11. The contacts 12 are electrically connected to a current conducting plate 13 which overlies the cover member 10 and whose upper side is engaged by a slider 14 of the terminal 15. It will be noted that the circuit including the terminals 7 and 15 is completed whenever the impeller 3 moves upwardly because the impeller then deforms the adjacent contact 11 which engages the respective contact 12 so that the terminal 7 is connected with the terminal 15 through the intermediary of the tongue 8, sleeve 9, one of the contacts 11, one of the contacts 12, plate 13, and slider 14.

The light source 5a of the flash unit 5 is located in front of a reflector 5 and this light source illuminates the subject whenever the impeller 3 establishes an electrical connection between the terminals 7 and 15, i.e., in response to actuation of the camera release so that the subject is illuminated while the shutter admits scene light. It will be noted that the socket 2 of the camera shown in FIG. 1 can be indexed in the customary way while at the same time coupling the casing 4A of the flash unit 4 to the housing H in such a way that the major portion of the casing 4A need not rotate and that the light source 5a always faces the subject which is observed in the viewfinder of the camera. Moreover, the impeller 3 which is normally provided for the sole purpose of firing selected lamps of a multiple flash lamp holder serves the additional purpose of firing the flash unit 4 in synchronism with opening of the shutter.

The contacts 11, 12 constitute a normally open switch which is actuatable by the impeller 3, preferably for the purpose of completing the circuit of the light source 5a.

The electronic flash unit 4 can be replaced with a greatly simplified flash unit wherein only the foot 6a is indexible with the socket 2 and the four contacts 11, sleeve 9 and tongue 8 are replaced with a single contact which is directly connected to the terminal 7 and extends into the path of upward movement of the impeller 3 so as to be deflectable directly against the terminal 15 or against the member 14. Such a flash unit can dispense with the contacts 12 and plate 13. The foot 6a is then rotatably suspended on the partition 4B which constitutes a fixed base of the casing.

FIG. 2 illustrates a second electronic flash unit 4' having a casing 4A', a light source 5a', a reflector 5', a projection 4a', a base 6' with a foot 6a' and a single opening 6c' for the impeller 3. The base 6'is stationary and its foot 6a' is again provided with prongs 6b' which engage the claws 2b of the socket 2. The two terminals of the flash unit 4' are shown at 16 and 18. These terminals are riveted to the partition 4B', as at 19a, 19, and the rivet 19a is connected with a deformable elastic contact 17 which can be flexed by the impeller 3 to engage the underside of the rivet 19. The rivet 19 constitutes a second contact of a normally open electric switch 17, 19.

In addition to serving as a locating means for holding the casing 4A' against rotation with reference to the top wall 1 of the housing H, the projection 4a' further serves as one component part of a means for disengaging the indexing mechanism of the camera from the socket 2 in response to proper attachment of the casing 4A'. This renders it possible to employ in the casing 4A' a base 6' which need not be indexed with the socket 2.

The indexing mechanism for the socket 2 comprises a turntable or disk 26 (see FIG. 3) which is secured to the post 2a or directly to the socket 2 and has four downwardly extending pins or legs 26a which are equidistant from each other. Successive pins 26a can be engaged and entrained by a shoulder 25b of a link 25 which is articulately connected to one arm of a lever 27 pivotable at 28 and biased by a torsion spring 29 so that its longer arm normally abuts against a projection 24a of a slide 24 forming part of the film transporting mechanism. The slide 24 has a toothed rack 24b meshing with a gear 23 on the shaft 23a of a rapid transport lever or wheel, not shown. When the gear 23 is rotated clockwise, as viewed in FIG. 3, the slide 24 pivots the lever 27 clockwise and the lever 27 pulls the link 25 in the direction indicated by arrow A. This causes the shoulder 25b to index the disk 26 and the socket 2 through 90°.

When the projection 4a' is inserted into the locating aperture 1b of the top wall 1, it pivots a bell crank lever 20 which is mounted on a stationary pivot pin 20a whereby the lever 20 engages a shoulder 21b of a slide 21 which is guided by pins 21c and has a suitably inclined front end portion 21a which engages a pin 25a of the link 25 so that the shoulder 25b of the link 25 is disengaged from the adjacent leg 26a of the disk 26. Consequently, when the slide 24 moves in a direction to the right, as viewed in FIG. 3, the shoulder 25b bypasses the nearest leg 26a and cannot index the disk 26 and socket 2. In other words, as long as the casing 4A' remains attached to the housing H, the film transporting mechanism of the camera can be actuated as often as necessary without indexing the socket 2.

The slide 21 is biased by a spring 22 so that it normally tends to assume the position of FIG. 3 in which the link 25 is free to index the socket 2. A handgrip portion 21A of the slide 21 can be depressed by hand if the user of the camera wishes to actuate the film transporting mechanism without indexing he socket 2. The slide 21 may but need not consist of elastic material. The spring 22 automatically returns the bell crank lever 20 into a position in which the upper arm of the lever 20 is located in the path of movement of the projection 4a' as soon as the casing 4A' is detached from the socket 2.

It is further within the purview of the invention to provide the casing 4A or 4A' with other types of locating means which prevents rotation of the electronic flash unit. For example, the projection 4a or 4a' can be replaced by a first magnet and the aperture 1b of the top wall 1 can be replaced with a second magnet which attracts the first magnet when the casing 4A or 4A' is properly coupled to the socket 2.

The details of the electric circuit of the electronic flash unit 4 or 4' form no part of the invention. All that counts is to provide in or on the flash unit a normally open switch which is closed in automatic response to outward movement of the impeller 3 so that the thus closed switch causes the light source 5a or 5a' to illuminate the subject simultaneously with opening of the shutter, i.e., in response to actuation of the camera release.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

1. The combination of a photographic apparatus having a housing provided with an aperture, a socket for multiple flash lamp holders indexible in said housing between a plurality of predetermined positions and an impeller which is movable from a first to a second position to extend outwardly through said aperture at least in said second position thereof and to thereby initiate the firing of a flash lamp in a holder which is connected with said socket, with an electronic flash unit having a casing including a foot directly but separably connectable to and indexible with said socket, said casing having an opening in register with said aperture to permit entry of said impeller into said casing at least in said second position of said impeller when said foot is connected with said socket, said flash unit further comprising normally open switch means provided in said casing and including first contact means and a plurality of second contact means, one for each position of said socket, said second contact means being indexible with and movable relative to said foot so that a different second contact means is located behind said opening in each position of said socket, said impeller being arranged to move the second contact means behind said opening into engagement with said first contact means not later than upon completion of movement from said first to said second position thereof when said foot is connected with said socket, and said flash unit further comprising a source of artificial light in circuit with said switch means and arranged to illuminate the subject in response to engagement between said first contact means and one of said second contact means.

2. The combination of claim 1, further comprising cooperating first and second locating means respectively provided on said casing and on said housing and arranged to hold the remainder of said casing against angular movement with respect to said housing when said foot is connected with said socket.

3. The combination of claim 2, wherein said first locating means comprises a projection on said casing and said second locating means comprises an aperture provided in said housing for said projection.

* * * * *